United States Patent [19]

Finck et al.

[11] 4,429,383
[45] Jan. 31, 1984

[54] METHOD FOR SEIZING TIME SLOTS OF A TIME-DIVISION MULTIPLEX SYSTEM WITH DYNAMIC MULTIPLEXERS

[75] Inventors: Herbert Finck, Wolfratshausen; Konrad Reisinger, Zorneding, both of Fed. Rep. of Germany

[73] Assignee: Siemens Aktiengesellschaft, Berlin & Munich, Fed. Rep. of Germany

[21] Appl. No.: 225,736

[22] Filed: Jan. 16, 1981

[30] Foreign Application Priority Data

Jan. 16, 1980 [DE] Fed. Rep. of Germany ....... 3001417

[51] Int. Cl.³ .............................................. H04J 3/16
[52] U.S. Cl. ........................................ 370/84; 370/80
[58] Field of Search ...................... 370/80, 84, 93, 112

[56] References Cited

U.S. PATENT DOCUMENTS 3,862,373  1/1975  Cohen et al. ......................... 370/84
4,068,098  1/1978  Thyselius .............................. 370/84
4,251,880  2/1981  Baugh et al. ......................... 370/80
4,330,689  5/1982  Kong et al. .......................... 370/84

*Primary Examiner*—Gerald L. Brigance
*Attorney, Agent, or Firm*—Hill, Van Santen, Steadman & Simpson

[57] ABSTRACT

In a time-division multiplexing system, data are supplied to the multiplexer with different speeds. Depending on the speed, time slot groups are allocated to the data, with the number of allocated time slots increasing with the speed. The search for groups of free time slots occurs in a fixed sequence. Data to which time slot groups at the end of the fixed sequence have been allocated, are relocated to time slot groups which have become free nearer the beginning of the sequence. The allocated time slot group for the forward transmission direction is signalled to the multiplexer of the remote station which in turn occasions a corresponding allocation of time slots for the reverse transmission direction for data originating at the remote station.

10 Claims, 4 Drawing Figures

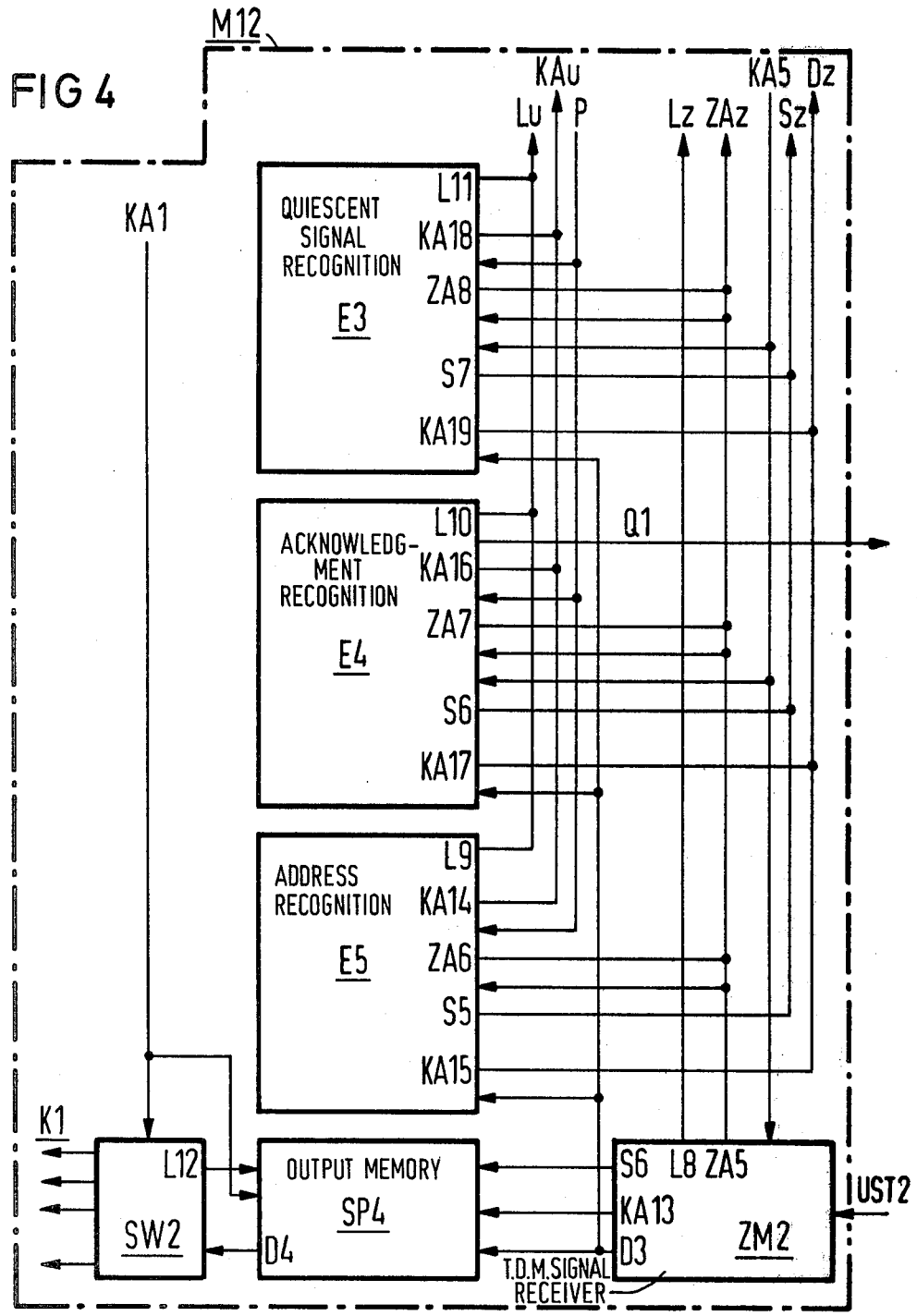

METHOD FOR SEIZING TIME SLOTS OF A TIME-DIVISION MULTIPLEX SYSTEM WITH DYNAMIC MULTIPLEXERS

BACKGROUND OF THE INVENTION

1. Field of the Invention

The present invention relates to dynamic time division multiplexing systems, and more particularly to a method of seizing time slots therein.

2. The Prior Art

The invention relates to a method for seizing time slots of a time-division multiplex system with dynamic multiplexers which makes it possible to correct data channels in both directions, so that the number 0 through $-1+2^m$ times n can be allocated to $2^m$ times n time slots of the time-division multiplex frame in sequence, and groups of the order i of $2^i$ time slots per time-division multiplex frame are seized with data of differing bit rate, where the numbers allocated to the time slots of a group differ by multiples from n and i is equal to the number 0 or equal to one of the whole, positive numbers.

Dynamic time-division multiplex transmission systems assign channels only to data terminals which are active. Therefore, they utilize the overall band width of the time-division multiplex path better than time-division multiplex transmission systems with a fixed allocation of channels. In general, thereby, the time-division multiplex signal is divided into fewer time slots than there are data channels connected to the dynamic multiplexers. Such dynamic multiplexers are sometimes referred to as statistical multiplexers. Within the individual time slots, either a single bit or one or more words with a plurality of bits, for example, in the form of envelopes, can be transmitted.

SUMMARY OF THE INVENTION

It has been found, in a previous development, that one envelope and one channel address can be transmitted within one time slot. In general, a plurality of relatively short envelopes are required for transmitting a message, and the channel address is allocated to each of these envelopes. Given a low bit rate, a channel address with the appertaining envelope is transmitted only a single time per time-division multiplex frame. Given a high bit rate, the channel addresses and the appertaining envelopes are transmitted several times per time-division multiplex frame. In case the individual envelopes consist of only a few bits, then this method is distinguished by great flexibility with respect to the data occurring with various bit rates without having to count on great delay times. The method, however, has the disadvantage that a relatively large number of bits are required for the channel addresses, so that the overall transmission capacity available for the actual messages is greatly reduced by the addresses.

The object of the present invention is to seize the time slots of a dynamic multiplexer in such manner that, given high flexibility with respect to different bit rates and without significant delay times, a great portion of the transmission capacity of the time-division multiplex path is available for the transmission of the actual messages.

In an illustrative embodiment, this object is achieved by means of the following method steps:

A. Before seizure of time slots, the order i of the required group of time slots is determined as a function of the existing bit rate of the data to be transmitted.

B. For determining free time slots, the time slot group of the order i are inspected in a fixed sequence within a time slot group of the order m, until a free time slot group of the order i has been found.

C. In case no free time slot group of the order i is found during the search for free time slot groups within the order m, a search is carried out within further time slot groups of the order m.

D. An address is allocated to each time slot of a free group of time slots found. This allocation is signalled to the multiplexer of the remote station, which in turn occasions the same allocation.

E. Independently of the determination of a group of free time slots, occupied groups of time slots are sought opposite the fixed sequence.

F. As soon as an occupied group of time slots is found, a new group of free time slots of the same order as the order of the occupied group is sought in the fixed sequence, said free time slots occurring in the fixed sequence before the occupied group which has been found.

G. When the new group of free time slots has been found, the address allocated to the occupied group is allocated to said time slots and this allocation is signaled to the multiplexer of the remote station, which in turn occasions an appropriate allocation.

H. As soon as the new group of time slots is seized, the previously seized group of time slots is released.

The present invention is distinguished in that, given high flexibility with respect to the data occurring with various bit rates, only slight delay times are to be expected and in that a great portion of the transmission capacity of the time-division multiplex path is available for the transmission of the actual messages. The large portion of transmission capacity for the transmission of the actual message bits is achieved in that the time slots for transmission of the time slot addresses are only briefly employed before the transmission of the actual message bits, but, after allocation of the time slot addresses, are exclusively available for the transmission of the message bits. Since the allocations of the time slot addresses are stored in the multiplexers, it is unnecessary to transmit the addresses during the overall duration of the message transmission. When it is desired that the allocations of the time slots are to be changed as little as possible, it is expedient to apply the following additional measures: (I and J omitted)

K. Beginning with the time slot group of the order m with the time slot number 0 allocated to the numeral 0, a free time slot group of the order i is sought, so that the sequence of the time slots is fixed with the numbers of the time slot group of the order m, and whereby a time slot group of the order $i \geq 1$ consists of a time slot group of the order $i-1$ and of those time slots whose numbers derive by means of the addition of the time slot numbers of the order $i-1$ and of the numeral $2^{m-1}$ times n.

L. In the search for free time slots, in case, beginning with the time slot number 0 of the time slot group of the order m, no free time slot group of the order i has been found, then, beginning with the time slots allocated to the numerals 1 through $n-1$, a respective search is carried out within the further time slot groups of the order m, whereby the numbers of the time slots differ in sequence by the numerals 1 through $n-1$ from the corresponding numbers of the time slot group of the order m with the time slot number 0.

M. The seized groups of time slots are sought, beginning with the last time slot and opposite the fixed sequence.

N. As soon as the seized group of time slots has been found, a new group of the same order of free time slots is sought, in the fixed sequence, said new group lying closer, in view of the fixed sequence, to the time slot number 0 than the seized group which was found.

In case the completion and the disconnection of the subscriber connections and the changes of the allocations are to take place as quickly as possible, and the transit times of the data are to be short, then it is expedient that the same addresses be allocated to the same time slots both for the forward direction as well as for the return direction.

It is expedient for the optimum realization of the method that the time slots in both dynamic multiplexers are seized in the same, fixed sequence and that the allocations at both multiplexers are changed in the same manner.

In a preferred sample embodiment of the invention, in which no buffer memories are required, the sequence of steps proceeds in such manner that subscribers who wish to transmit data report to the dynamic multiplexer, after which the dynamic multiplexer seeks the required group of time slots, and then, after allocation of the addresses to the time slots, the subscriber receives permission to transmit. When the subscriber has deposited his data, he gives notice of such to the dynamic multiplexer which subsequently cancels the allocation.

BRIEF DESCRIPTION OF THE DRAWINGS

Reference will now be made to sample embodiments of the invention described on the basis of FIGS. 1 through 4, where the same units illustrated in a plurality of Figures are referenced with the same reference numerals:

FIG. 4 is a functional block diagram of the demultiplexer part of the apparatus illustrated in FIG. 1.

DESCRIPTION OF THE PREFERRED EMBODIMENT

Figure 1:
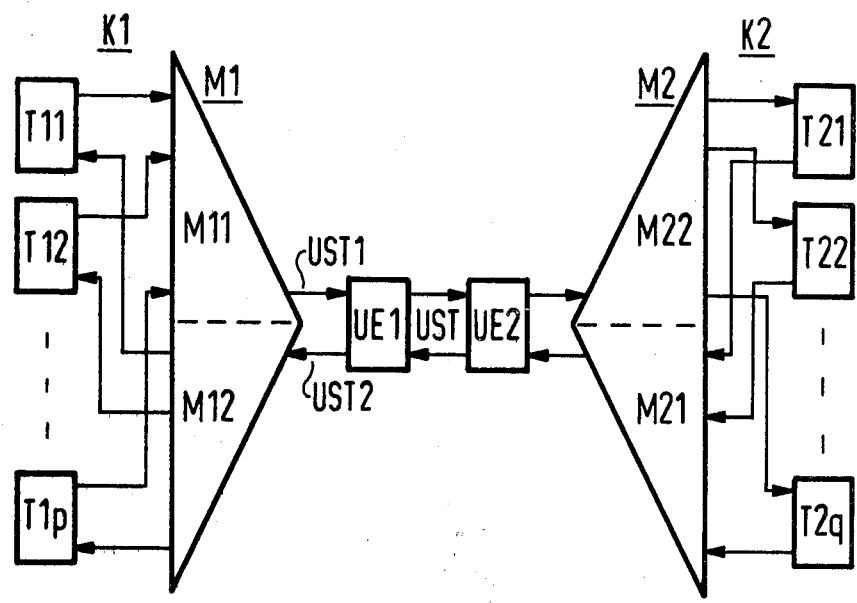
FIG. 1 is a functional block diagram of a time-division multiplex system with dynamic multiplexers.

FIG. 1 shows a time-division multiplex transmission system incorporating an illustive embodiment of the present invention. The transmission means UE1 and the subscribers T11, T12, . . . T1p are provided in the area of the dynamic multiplexer M1. The transmission means UE2 and the subscribers T21, T22, . . . T2q are situated in the area of the dynamic multiplexer M2. The two multiplexers are connected to one another via the transmission path UST. Messages are to be transmitted in both directions via said transmission path.

Subscribers may be allocated in a plurality of different ways. In a first case, the subscribers T11, T12, . . . T1p are allocated in a reversibly clear manner to the subscribers T21, T22, . . . T2q. In this case, with p=q, the same number of subscribers are connected to both multiplexers and the reversibly clear allocation is already given, on one side, by means of the connection of the channels K1 to the multiplexer M1 and, on the other side, by means of the connection of the channels K2 to the multiplexer M2. For example, the subscribers T11 through T1p can each be connected in sequence to the subscribers T21 through T2q, so that data connections in both directions exist between respective subscribers.

It is presumed that the data of the individual subscribers T11 through T1p are transmitted and received with differing bit rates. The same applies to subscribers T21 through T2q. Also, the use of dynamic multiplexers M1 and M2, allows the plurality p of subscribers to be greater than the plurality of time slots of the time-division multiplex signal UST1 employed for the transmission of messages. Similarly, the plurality q of subscribers is greater than the plurality of those time slots of the time-division multiplex signal UST2 which serve for the transmission of the actual messages.

A second case of subscriber allocation occurs when at least individual subscribers of the subscribers T11 through T1p can be selectively connected to addressable subscribers T21 through T2q. In this case, differing numbers of subscribers are connected to the multiplexers, so that the number p does not equal the number q. In this case, too, however, differing bit rates of the data transmitted via the individual channels are presumed. Moreover, it is again assumed that the number of time slots present for message communication is smaller than the number of corresponding subscribers and channels.

Figure 2:
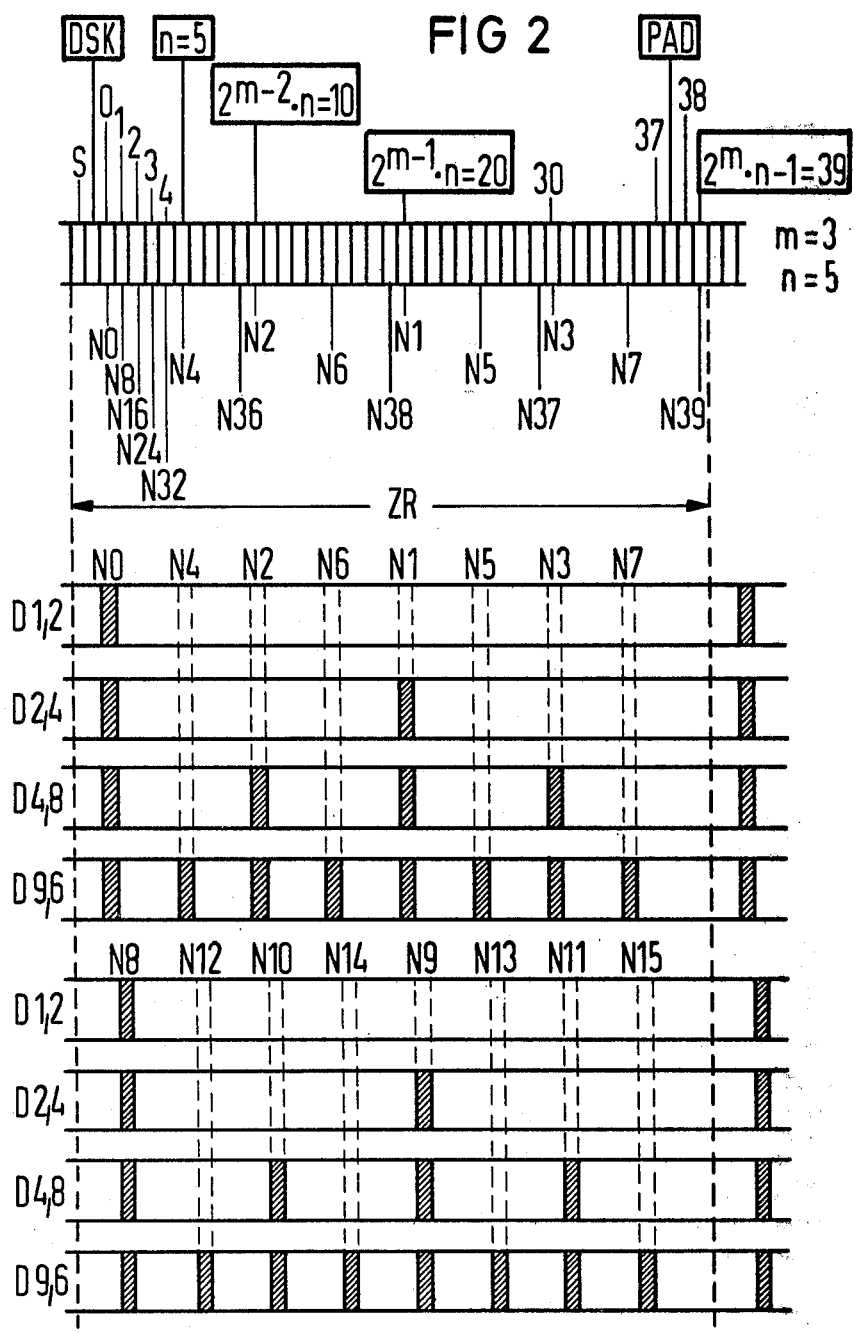
FIG. 2 is a generalized diagram of a time-division multiplex signal, and diagrams of time slot seizures.

FIG. 2 shows at its top, a sample embodiment of the time-division multiplex signal UST1. The time-division multiplex frame ZR contains a total of 43 time slots. Within these time slots, a single bit can be transmitted or, alternatively, words with a respective plurality of bits can be transmitted. In this sample embodiment, ten respective bits are transmitted per time slot. The time slots S, DSK, PAD have nothing to do with the present invention and are only mentioned for the sake of completeness. Of them, the time slot S serves for synchronization, the time slot DSK serves for transmitting service signals and occasional speed corrections. Bit rate corrections are undertaken with the assistance of the time slot PAD because there are time-division multiplex frames with said time slot PAD as well as time-division multiplex frames without said time slot PAD. However, the actual messages are transmitted during the duration of the 40 time slots to which the numbers 0, 1, 2, 3, 4, 5, . . . 39 are allocated. The number 40 can be represented in the form $2^m$ times n, whereby the number m means one of the positive, whole numbers −1 and the number n means a primary number. In the present case, with $2^3$ times 5, a total of 40 time slots are provided for the transmission of the actual messages. In general, the number ($2^m$ times n)−1 is allocated to the last time slot. In general, the number $2^{m-1}$ time n corresponds to the time slot to which the number 20 is allocated. In general, the number $2^{m-2}$ times n corresponds to the time slot to which the number 10 is allocated and, in general, the number n corresponds to the time slot to which the number 5 is allocated. In addition to the numbers 0 through 39, numbers N0 through N39 are allocated to the time slots, and the numbers N0 through N39 establish a sequence R.

Since, as has been assumed, the data occur with differing bit rates or speeds, one or more time slots are provided per time-division multiplex frame ZR. In the presentation at the lower part of FIG. 2, it is assumed that only a single time slot is required for the data D1, 2 which occur with a bit rate of 1.2 kbit per second. For example, the data of a single data channel can be transmitted via the time slot to which the number 0 is allocated. It would be theoretically possible to transmit the data of 40 such data channels via the 40 time slots of the time-division multiplex signal. In general, however, this is not possible since, of course, one must reckon with the fact that data of higher speeds or, respectively, bit rates also occur. For example, two time slots per time-division multiplex frame are required for the data D2, 4 which occur with a bit rate of 2.4 kbit per second. According to FIG. 2, these, for example, can be the time slots to which the numbers 0 and 20 are allocated corresponding to N0 and N1. These numbers differ by the four-fold multiple of the number n=5. In all, 20 such data channels can be connected in each frame of the time-division multiplex signal in case no data of other bit rates is transmitted.

The data D4, 8 occur with a bit rate of 4.8 kbit per second, so that four respective time slots must be reserved per time-division multiplex frame. These, for example, can be the time slots with the numbers N0, N1, N2, N3, as shown in the lower part of FIG. 2. Overall, 10 such data channels can be connected to the time-division multiplex path. The four time slots with the numbers N0, N1, N2, N3 form a group which is characterized by its order i=2, such group having $2^i=4$ time slots. The illustrated group contains the time slot with the number N0. A total of eight different groups of order 2 are possible. For example, a second group of the order 2 is illustrated in the lower part of FIG. 2, for the data signal D4, 8, said group being formed of the time slots numbers N8, N9, N10 and N11.

The data D9, 6 occur with a bit rate of 9.6 kbit per second, and so a total of eight time slots must be reserved per time-division multiplex frame. These can be the time slots with the numbers N0, N1, N2, N3, N4, N5, N6, N7 which, with i=3, form a group of the third order. Five different groups of the order 3 are possible. For example, FIG. 2 shows a second group of time slots with the numbers N8, N9, N10, N11, N12, N13, N14, N15 for the data signal D9, 6. Beginning with the time slots numbers N16 or, respectively, N24 or, respectively N32, further groups of the order i=3 can be formed.

Before seizure of the time slots, free time slots must be identified. Therefore, the individual time slots are checked in a prescribed sequence. If, for example, a group of the third order is required, then the time slots with the numbers N0, N1, N2, N3, N4, N5, N6, N7 are checked in this sequence. When one of said time slots N0 through N7 is already seized, then this group can no longer be used for the transmission of the data D9, 6 and another group of the third order is investigated; for example, the group of the third order with the time slot number N8. Thus, the following sequence of the time slots and numbers was observed: N(0+8)=N8, N(1+8)=N9, N(2+8)=N10, N(3+8)=N11, N(4+8)=N12, N(5+8)=N13, N(6+8)=N14, N(7+8)=N15. In case only a single time slot of this group is seized, another group of the third order, for example, the group with the time slots N(0+16)=N16 and N(1+16)=N17 must be checked. Should the data likewise not be capable of accommodation in this group as well, then a further group of the third order is checked. If necessary, the last group of the third order is likewise checked. In case at least one time slot of said last group is likewise seized, then the data D9, 6 cannot be transmitted at this moment and must be intermediately stored either at the subscriber or in the multiplexer until a group of time slots of the third order is available.

If no group of the third order is currently available for data transmission, then all time slots of the time-division multiplex frame need not of necessity be seized, for groups of a lower order may then be available. When, for example, as illustrated in FIG. 2, the time slot N0 is seized by the data D1, 2 and when the data D2, 4 are to be transmitted, then a group of order 1 must be sought and found. Since, in accordance with the assumption, the time slot N0 of the group of the first order with the time slots N0 and N1 is already seized, these two time slots are no longer suitable for transmitting the data D2, 4. In this case, however, the time slots N2 and N3 are still free and, therefore, these time slots can be employed for the transmission of the data signal D2, 4. When only a single time slot is required for transmitting the data D1, 2, then a renewed search is carried out in the sequence of the numbers N0, N1 and, given the assumptions made, it is determined that the time slot N1 is still free. The data D1, 2 are then transmitted via said time slot N1.

In a somewhat more general presentation, the Table 1 shows the sequence in which the seizure of the individual time slots is checked. The sequence R of the numbers N1 through N7 can be seen from the first column. The second column relates to the groups GR. Table 1 shows only the sequence beginning with the time slot N0. The sequence which begins with the time slots with the numbers N8, N16 . . . N32 is discussed hereinafter. The groups GR0, GR1, GR2, GR3 of the order 0 or, respectively, 1 or, respectively, 2 or, respectively, 3 can be seen from Table 1. With i=0, the group of the order 0 consists of only the single time slot of the number N0 which corresponds to the number 0.

TABLE 1

| R | GR | | | |
|---|---|---|---|---|
| N0 = 0 | GR0 i = 0 | GR1 | | |
| N1 = N0 + $2^{m-1}\cdot n$ | | i = 1 | | |
| N2 = N0 + $2^{m-2}\cdot n$ | | | GR2 i = 2 | |
| N3 = N1 + $2^{m-2}\cdot n$ | | | | |
| N4 = N0 + $2^{m-3}\cdot n$ | | | | GR3 i = 3 |
| N5 = N1 + $2^{m-3}\cdot n$ | | | | |
| N6 = N2 + $2^{m-3}\cdot n$ | | | | |
| N7 = N3 + $2^{m-3}\cdot n$ | | | | |

With i=1, the group GR1 of the order 1 consists of the time slots with the number N0 and with the number N1=$2^{m-1}$ times n.

With i=2, the group GR2 of the order 2 consists of the time slots numbers N0, N1 and of those time slots whose number derives by means of addition of the number N0 or, respectively, N1 and the number $2^{m-2}$ times n. The group GR2 thus comprises the time slots with the number N0, N1, N2 and N3. The group GR3 of the order 3 consists, on the one hand, of the time slots with the number N0, N1, N2 and N3.

The further number N4, N5, N6, N7 derive by means of addition of the number N0 or, respectively, N1 or, respectively, N2 or, respectively, N3 and the number $2^{m-3}$ time n.

In general, the time slot group of the order i consists of the time slot group of the order i−1 and of those time slots whose numbers derive by means of addition of the numbers of the order i−1 and the number $2^{m-1}$ time n.

The sequence R with respect to the number N8 through N15 is given by Table 2. According to Table 2, the time slots with the numbers N8 through N15 derive in that, in sequence, one adds the number 1 to the numbers N0 through N7. The time slots with the numbers N16 through N23 or, respectively, N24 through N31 or, respectively, N32 through N39, derive in a similar manner in that, in sequence, one adds the numbers 2 or, respectively, 3 or, respectively, 4 to the numbers N0 through N7.

In summary, it can be stated that, beginning with the number N0, the sequence R is given by the group of the order $i-m$, as was explained on the basis of Table 1. Beginning with the time slot with the number $N(2^m)$, the sequence R is given by the group of the order $i=m$ whose numbers begin with $N(2^m)$ and which was explained on the basis of Table 2. Beginning with the time slot $N(2^{m+1})$, the sequence R is given by the group of the order $i=m$ whose numbers begin with $N(2^{m+n-3})$, the sequence is fixed by the last group of the order $i=m$.

TABLE 2

| R | GR | | | |
|---|---|---|---|---|
| N8 = 1 | GR0 i = 0 | GR1 | | |
| $N9 = N8 + 2^{m-1} \cdot n = N1 + 1$ | | i = 1 | | |
| $N10 = N8 + 2^{m-2} \cdot n = N2 + 1$ | | | GR2 | |
| $N11 = N9 + 2^{m-2} \cdot n = N3 + 1$ | | | i = 2 | |
| $N12 = N8 + 2^{m-3} \cdot n = N4 + 1$ | | | | GR3 |
| $N13 = N9 + 2^{m-3} \cdot n = N5 + 1$ | | | | i = 3 |
| $N14 = N10 + 2^{m-3} \cdot n = N6 + 1$ | | | | |
| $N15 = N11 + 2^{m-3} \cdot n = N7 + 1$ | | | | |

The number i can either mean the number 0, or one of the positive whole numbers which are smaller or equal to the number m. The time slot group with the order m, thus, is the group with the respectively most time slots. Each group consists of $2^i$ time slots. The time slots of the order 0 have a single time slot, since $2^0=1$. The further groups contain $2^i$ time slots, and the group $2^m$ contains the most time slots. In case at least one of the time slots is seized in the transmission of data, then data with $m+1$ differing bit rates can be transmitted. For example, according to FIG. 2, with $m=3$, the data D1, 2; D2, 4; D4, 8; and D9, 6 with a total of four different bit rates can be transmitted. The method for seizing time slots described here can be described by means of the following method steps:

1. Before seizure of the time slots, the order i of the required time slot group is determined as a function of the existing bit rate of the data to be transmitted. Thus, for example, when the data D2, 4 are to be transmitted with a bit rate of 2.4 kbit per second, then, first, the order $i=2$ is determined for the required time slot group.

2. In order to identify free time slots, the time slot groups of the order i within a time slot group of the order m are checked in a fixed sequence, until a free time slot group of the order i is found. In the present sample embodiment, the time slot groups of the order $i=2$ are checked within the time slot group of the order $m=3$, whereby this begins with the time slot number 0. Thus, it is first checked as to whether the time slot, with numbers N0 and N1 within the time slot group with the number N0, N1, N2, N3, N4, N5, N6, N7 is still free. Should one of the two time slots numbers N0 or N1 already be seized, then the time slots with numbers N2 and N3 are checked.

Within the time slot group of the order m, a sequence of time slots is fixed which begins with the time slot group of the order 0, consisting of the time slot number 0. The further numbers of the time slot group of the order m can be recursively described by referring to the time slot groups of the next lower order i. This is because the time slot group of the order i consists of the time slot group of the order $i-1$, plus those time slots whose numbers are formed by means of addition of the time slot number of the order $i-1$ and the number $2^{m-1}$ times n, as described in connection with Table 1.

3. In case no free time slot group of the order i was found in the search for a free time slot group within the order m, then a search is carried out within a further time slot group. If no free time slot group of the order 2 can be found within the time slot group of the order 3 with the time slots number N0, N1, N2, N3, N4, N5, N6, N7, then a search is carried out within another time slot group of the order 3; namely, within the group with the time slot N8, which consists of the time slots of the numbers N8, N9, N10, N11, N12, N13, N14, N15. In case further searching must be carried out, said search is carried out within further time slot groups of the order 3, i.e., within the groups with the time slot N16 or, respectively, N24 or, respectively, N32.

4. When a group of free time slots has been found, an address is allocated to each time slot of such groups and this allocation is signalled to the multiplexer of the remote station which in turn occasions a corresponding allocation. Thus, when a group of free time slots has been found in the area of the multiplexer M1 illustrated in FIG. 1, then an address is allocated to each time slot of that group. For example, when a group of the second order is required and the group of time slots illustrated in FIG. 2 with the numbers N0, N1, N2, N3 has been found, then one and the same address is allocated to these time slots; it is expedient to execute this both for the forward direction from multiplexer M1 to the multiplexer M2 as well as for the return direction from the multiplexer M2 to the multiplexer M1. This allocation is signalled proceeding from the multiplexer M1 to the multiplexer M2 of the remote station which in turn makes the same address allocation to the time slots. Subsequently, the connections of the calling subscriber to the called subscribers are produced via the respectively identified free time slots.

5. Independently from the identification of a group of free time slots, seized groups of time slots are sought in a sequence opposite to the fixed sequence. This can occur during or after the identification of a group of free time slots. When the sequence R of FIG. 2 is used, then a search for seized groups of time slots is carried out opposite said fixed sequence R. In the present sample embodiment, thus, the time slots N39, N38, . . . N3, N2, N1, N0 are investigated. This search extends to all groups of all orders.

6. When a seized group of time slots has been found, then a new, free group of time slots is sought which, in view of the fixed sequence, must lie in front of the seized group. Based on the sequence according to FIG. 2, it must lie closer to the first time slot number N0. For example, let it be assumed that the time slots N39 and N38 are free and that the time slot N37 is seized. Then the time slot N37 cannot belong to any group of the order 3 or 2, but can belong to a group of the 1 or 0. When the time slot N37, together with the time slot N36 forms a group of the order 1, then, in the fixed sequence, a new group of the order 1 of free time slots is sought which, in view of said fixed sequence, lies closer to the time slot N0. For example, a new group of order 1 could be the one containing time slots N0 and N1.

7. When the new group of time slots has been found, such as, for example, the group with N0 and N1, the address allocated to the time slots N37 and N36 is allocated, both for the forward direction as well as for the return direction, to the two time slots N0 and N1 and said allocation is signalled to the multiplexer of the remote station, which in turn makes a corresponding allocation. Thus, the new group which is formed of the time slots N0 and N1 is seized.

8. As soon as the new group of time slots is seized, the group, in this example, with the time slots N36, N37 is released.

The method of the present invention thus seizes the time slots of the time-division multiplex frame in such manner that an optimum transmission capacity is available for future seizures, particularly for data with a higher transmission speed.

Figure 3:
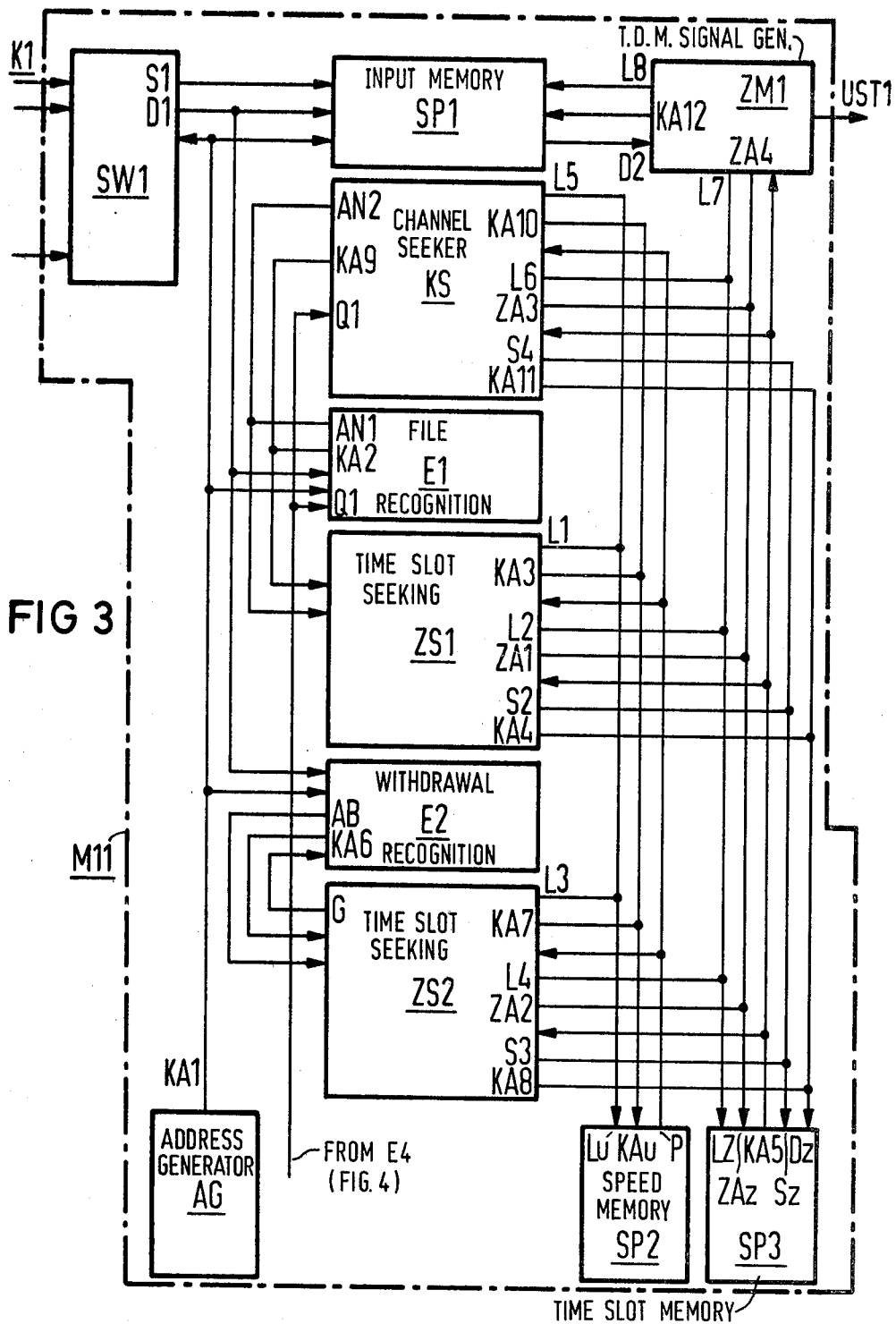
FIG. 3 is a functional block diagram of the multiplexer part of the apparatus illustrated in FIG. 1.

FIG. 3 shows the multiplexer part M11 of the multiplexer M1 illustrated in FIG. 1. The address generator AG cyclically generates the channel addresses of the channels K1 and emits said channel addresses via the output KA1. The relative frequency of a channel address corresponds to the transmission speed of the appertaining channel. For example, a channel address for a channel with 9.6 kbits per second is generated eight times as often as a channel address for one with 1.2 kbits per second.

The switch mechanism SW1, which operates as a sequential switch, respectively connects each channel specified by the channel address KA1 to the output D1 and simultaneously emits a write command via the output S1. The data transmitted via the channels is thus emitted via the output D1 of the switch mechanism SW1, and written into an input memory unit SP1.

The input memory unit SP1 serves as an intermediate memory for the data. It contains one cell for each channel. When a write command has been emitted via the output S1 of the switch mechanism SW1, then the data output via the output D1 of the switch mechanism SW are stored in that cell of the input memory SP1 which is addressed by the corresponding channel address. Since the channel addresses are cyclically generated, the data of all channels cyclically arrive into the input memory SP1. When a read command is output via the output L8 of the time-division multiplex signal generator ZM1 and a channel address is output via the output KA12, then the input memory SP1 outputs the data from the cell addressed with the channel address. These data arrive via the output D2 into the time-division multiplex signal generator ZM1. Thus, only those data for which time slots are allocated in the time-division multiplex signal are read out.

The speed memory SP2 exhibits just as many cells as there are channels and, for each channel, permanently stores the transmission speed allocated to said channel. With a read command at input Lu and with a channel address at input KAu, the transmission speed stored in that cell which is addressed with the channel address is output via the output P.

The time slot memory SP3 exhibits just as many memory cells as there are time slots in the time-division multiplex frame. Channel addresses are stored in said cells. The time slot memory SP3, thus, contains the allocation of the time slots of the time-division multiplex frame to the channels to which time slots are allocated in the time-division multiplex signal. In addition, information is stored which is required for producing and cancelling the allocation of the channels to the time slots. With a write command at input at Sz, a channel address and the said information are inscribed via the input DZ in that cell which is addressed with the time slot address at the input ZAz. The content of a cell is read by means of a read command at the input Lz upon consideration of the time slot address adjacent to the intput ZAz.

Via the output D1 of the switching mechanism SW1, the file recognition unit E1 receives, on the one hand, the data transmitted via the channels and, on the other hand, it receives the corresponding channel address via the output KA1 of the address generator AG. Based on a change from a quiescent signal to a file signal, the file recognition unit perceives what channels desire a transmission path. When the file recognition unit E1 identifies a file signal in a channel, then it reports this via the output AN1 to the time slot-seeking unit ZS1. At the same time, the file recognition unit E1 reports the channel address appertaining to the file signal via the output KA2.

As soon as time slots in the time-division multiplex signal are allocated for a channel in forward and return direction and the demultiplexer part M12 illustrated in FIG. 1 has received the confirmation for the allocation from the multiplexer M2 of the remote station, the file recognition unit E1 receives an acknowledgement via the input Q1. In response thereto, the file recognition unit signals the time slot-seeking unit ZS1 which channel has been recognized as having a file signal, and therefore needing time slot allocation.

The time slot-seeking unit searches free time slots in the time slot memory SP3 for the channels in which the file recognition unit E1 has recognized a file signal or for which the channel seeker KS has requested a relocation. When the time slot-seeking unit ZS1 has found free time slots, then it effects the storage of the channel addresses in the time slot memory SP3.

When a signal which identifies a file signal recognition, or filing, has been output via the output AN1 of the file recognition unit E1, or via the output AN2 of the channel seeker KS, then, at the same time, the associated channel address is output via the output KA2 or, respectively, KA9 to the time slot-seeking unit ZS1. Subsequently, the time slot-seeking unit ZS1 emits a read command via the output L1 and, via the output KA3, emits the channel address to the speed memory SP2. The speed memory SP2, via the output P, emits the transmission speed of the address channel to the time slot-seeking unit ZS1. Based on the transmission speed, said time slot-seeking unit ZS1 determines the order of the time slot group required for the appertaining channel and seeks a free group of said order in the time slot memory SP3, in accordance with the sequence R of Tables 1 and 2. To that end, the time slot-seeking unit ZS1 emits read commands via the output L2 and emits time slot addresses to the time slot memory SP3 via the output ZA1. The time slot memory SP3 supplies the content of the address cells via the output KA5 to the time slot-seeking unit ZS1 which determines therefrom whether the respectively addressed cell is seized or free. The time slot-seeking unit ZS1 searches the time slot memory SP3 in the fixed sequence R until a free group of time slots has been found.

When the time slot-seeking unit ZS1 has found a free group, then the associated channel address and the information "transmit channel address" is entered into all cells of the free group of time slots. For the inscription, the time slot-seeking unit ZS1 supplies write commands via the output S2; supplies the time slot addresses associated with the free group via the output ZA1 and; via the output KA4, it also supplies the channel address as well as the information "transmit channel address".

By monitoring the signals transmitted via the channels, the withdrawal recognition unit E2 detects which channels indicate, by transmitting a withdrawal signal, that they no longer require the transmission path. The withdrawal recognition unit E2, via the output D1 of the switching mechanism SW, cyclically receives the signals transmitted via the channels and, at the same time, via the output KA1 of the address generator AG, it receives the appertaining channel addresses. When the withdrawal recognition unit E2 identifies a withdrawal signal, then it reports this via the output AB together with the associated channel address at the output KA6 of the time slot-seeking unit ZS2.

As soon as the time slots in the time-division multiplex signal seized for the channel are released, the withdrawal recognition unit E2 receives an acknowledgement via the output G of the time slot-seeking unit ZS2. Subsequent thereto, the withdrawal recognition unit E2 can report to the time slot-seeking unit ZS2 the next channel which has sent a withdrawal signal.

The time slot-seeking unit ZS2 seeks the time slots of those channels in the time slot memory SP in which the withdrawal recognition unit E2 has recognized a withdrawal and releases said time slots. When a withdrawal exists at the output AB, with the associated channel address at the output KA6 of the withdrawal recognition unit E2, the time slot-seeking unit ZS2 first emits a read command to the speed memory SP3 via the output L3, together with the channel address at the output KA7. The speed memory SP3 supplies the transmission speed of the associated channel to the time slot-seeking unit ZS2 via the output P.

Based on the transmission speed, the time slot-seeking unit ZS2 determines the order required for said channel and searches the time slot memory SP in the sequence R for memory cells which are seized with the same channel address. To that end, the time slot-seeking unit ZS2 emits respective read commands via the output L4 and, moreover, forwards time slot addresses to the time slot memory SP3 via the output ZA2. Said time slot memory SP3 supplies the content of the address cells to the time slot-seeking unit ZS2 via the output KA5. The time slot-seeking unit ZS2 compares in each cell whether the channel address stored in the cell coincides with the channel address which is sought. The search is continued until the group of time slots has been found in which the coincidence of the channel addresses is given.

When the time slot-seeking unit ZS2 has found the group with the channel addresses sought, then it enters the information "quiescent signal" in all cells in the time slot memory SP3 associated with said group. To this end, the time slot-seeking unit ZS2 emits write commands via the output S3. It also emits the time slot addresses belonging to the group via the output ZA2 and, via the output KA8, it emits the information "quiescent signal".

The channel seeker KS continuously seeks seized time slots in the time slot memory SP3, whereby it proceeds opposite the sequence R and begins with the last time slot. The channel seeker KS reports the respective channel found to the time slot-seeking unit ZS1. After relocation of the channel into time slots which lie closer to the time slot N0, it releases the previously seized time slots.

In detail, the channel searcher KS emits read commands via the output L6 and it emits the time slot addresses to the time slot memory SP3 in a sequence opposite to the fixed sequence R. The time slot memory SP3 supplies the content of the addressed cells to the channel seeker KS via the output KA5. The channel seeker KS recognizes from the cell content whether the respective cell is seized or free and searches the time slot memory SP3 until it has found a seized cell. The channel address contained in said cell is supplied by the channel seeker KS via the output KA9 to the time slot-seeking unit ZS1. At the same time, the channel searcher KS supplies a signal via the output AN2 to the time slot-seeking unit ZS1. The time slot-seeking unit ZS1 then seeks an empty group of time slots into which the channel may be relocated.

As soon as time slots have been allocated in the time-division multiplex signal in the foward and return direction for the channel to be relocated and the demultiplexer part M12 has received the confirmation for the allocation from the multiplexer M2 of the remote station, the channel seeker KS receives the acknowledgement via the input Q1. Subsequent thereto, the channel seeker releases those time slots which were previously seized for the relocated channel. To that end, the channel seeker KS first emits a read command via the output L6 and via the output KA10 it emits the channel address to the speed memory SP2 which signals the transmission speed of the appertaining channel via the output P. Based on this, the channel seeker determines the order belonging to said channel and, beginning with the first time slot cell found to be occupied, enters the "quiescent signal" in the time slot memory SP3 in all time slot cells of said group. For this inscription, the channel seeker KS supplies a write command via the output S4, further supplies time slot addresses via the output ZA3, and the information "quiescent signal" via the output KA11.

The time-division multiplex signal generator ZM1 generates the time-division multiplex signal UST1 which is transmitted to the multiplexer M2 of the remote station. A sample embodiment of said time-division multiplex signal is shown at the top of FIG. 2.

The time-division multiplex signal generator ZM1 generates time slot addresses in the sequence of the number 0, 1, 2, 3, . . . 39 and emits said time slot addresses via the output ZA4, together with a read command via the output L7, to the time slot memory SP3. Said time slot memory supplies the content of the cell addressed by the time slot address to the time-division multiplex signal generator ZM1 via the output KA5. If the addressed cell contains the information "quiescent signal", then the time-division multiplex signal generator inserts a quiescent signal into the corresponding time slot of the time-division multiplex signal. If the cell contains a channel address and the information "transmit channel address", then the time-division multiplex signal generator inserts the channel address into the time slot. If the cell contains the channel address and the information "send acknowledgement", then the time-division multiplex signal generator inserts an acknowledgement signal into the time slot. If the cell contains the channel address and the information "transmit text", then the time-division multiplex signal generator ZM1 first emits a read command via the output L8 and the channel address via the output KA12 to the input memory SP1 and then inserts the content of the memory cell addressed in the input memory SP1, which is output via the output D2, into the time slot of the time-division multiplex signal ZS1.

FIG. 4 shows the demultiplexer part M12 which is also schematically illustrated in FIG. 1. A time-division multiplex signal receiver ZM2 receives the time-division multiplex signal UST2 transmitted by the multiplexer M2 of the remote station, recognizes the frame synchronization word contained in the time-division multiplex signal and supplies the content of the time slots to an output memory SP4 via the output D3, together with the time slot address via the output ZA5. The time slot addresses are generated by a counter which is started upon reception of the frame synchronization word. The time-division multiplex signal receiver emits the time slot address, via the output ZA5, to the time slot memory SP3 of the transmission part M11 as well, together with a read command via the output L8. The time slot memory SP3 emits the content of the memory cell addressed by the time slot address to the time-division multiplex signal receiver ZM2 via the output KA5. If the cell contains one of the information "quiescent signal", "transmit channel address", or "transmit acknowledgement", then the time-division multiplex signal receiver ZM2 suppresses the transfer of the signal contained in the received time slot to the output memory SP4. If the cell contains a channel address and the information "transmit text", then the time-division multiplex signal receiver ZM2 transfers the signal contained in the receive time slot via the output D3, together with the channel address at output KA13 and a write command at output S6 to the output memory SP4.

The output memory SP4 serves as an intermediate memory for the data signals received from the time-division multiplex signal receiver ZM2. Only the data signals of the channels to which time slots are allocated in the time-division multiplex signal are inscribed in the output memory SP4. The contents of all memory cells for the channels K1 are cyclically read. The output memory SP4 contains one memory cell for each channel K1.

A data signal emitted via the output D3 is inscribed in a cell of the output memory SP4 by means of the write command at the output S6 and by means of the channel address at the output KA13. The content of a cell is read by means of a read command emitted via the output L12 and by means of the specification of a channel address emitted via the output KA1 of the address generator AG. The content of the read cell is output via the output D4.

The switching mechanism SW2 respectively reads the content of a memory cell of the output memory SP4 specified with the channel address and through-connects the signal contained in said cell to the corresponding channel. For memory cells which contain a data signal, the data signal is through-connected; for memory cells which contain no data signal, a quiescent signal is through-connected.

By means of monitoring the signal output from the time-division multiplex signal receiver ZM2, via the output D3 and by means of accepting the time slot address output via the output ZA5, the address recognition unit E5 recognizes the time slots in which a channel address is received. The reception of the channel address indicates that the multiplexer of the remote station M2 has allocated these time slots to the corresponding channel. When the address recognition unit E5 identifies a channel address, then the address recognition unit first reads the transmission speed belonging to said channel in the speed memory SP2 of the multiplexer part M11. To that end, the address recognition unit E5 emits a read command via the output L9 and emits the appertaining channel address via the output KA14. The speed memory SP2 forwards the speed via the output P to the address recognition unit E5. Said address recognition unit E5, based on the speed, identifies the required order and enters the appertaining channel address and the information "send acknowledgement" in all time slots of the group in the time slot memory SP3. To that end, the address recognition unit E5 fowards a write command to the output S5, the time slot address via the output ZA6, and the channel address as well as the information "send acknowledgement" via the output KA15.

When the address recognition unit E5 determines that no further channel addresses are arriving in the appertaining channel, but, rather, that a text is arriving, then the address recognition unit E5 cancels the information "send acknowledgement" in the appertaining memory cells of the time slot memory SP3 and enters the information "transmit text".

By means of monitoring the signal output by the time-division multiplex signal receiver ZM2 via the output D3 and the time slot addresses output via the output ZA5, the acknowledgement recognition unit E4 identifies the time slots in which an acknowledgement is received. The reception of the acknowledgement indicates that the multiplexer M2 of the remote station has received a channel address and has undertaken the requested allocation of the time slots for said channel.

Parallel to the time slot address output via the output ZA5, the acknowledgement recognition unit E4 receives the channel address stored under said time slot address via the output KA5, so that the acknowledgement recognition unit E4 knows to which channel the acknowledgement belongs.

The acknowledgement recognition unit E4 then reads the transmission speed belonging to the acknowledging channel, in the speed memory SP2. To that end, the acknowledgement recognition unit E4 emits a read command via the output L10 and the channel address via the output KA16. The speed memory SP12 transfers the speed via the output P to the acknowledgement recognition unit E4. Said acknowledgement recognition unit E4, based on the speed, determines the order belonging to the channel and enters the information "transmit text" in all time slots of the group in the time slot memory SP3. Subsequently, the acknowledgement recognition unit E4 emits an acknowledgement signal via the output Q1 to the multiplexer part M11.

By means of monitoring the signal output by the time-division multiplex signal receiver ZM2 via the output D3 and the time slot addresses output via the output ZA5, the quiescent signal recognition unit E3 recognizes with which time slots a quiescent signal was received. The reception of the quiescent signal indicates that said time slots are not or, respectively, are no longer seized in the multiplexer M2 of the remote station. Parallel to the time slot address at the output ZA5, the quiescent signal recognition unit E3, via the output KA5 of the time slot memory SP3, receives either the channel address stored under said time slot address or the information "quiescent signal".

When the quiescent signal recognition unit E3 receives a channel address from the time slot memory SP3, it reads the transmission speed belonging to said channel address read from the speed memory SP2. To that end, the quiescent signal recognition unit E3 emits a read command via the output L11 and the channel address via the output KA18. The speed memory SP2 transfers the speed via the output P to the quiescent signal recognition unit E3. Said quiescent signal recognition unit E3, based on the speed, determines the order and enters the information "quiescent signal" into all time slots of the group in the time slot memory SP3. To that end, the quiescent signal recognition unit E3 respectively emits a write command via the output S7, emits the time slot address via the output ZA8, and the information "quiescent signal" via the output KA19. In case the quiescent signal recognition unit E3 contains the information "quiescent signal", it executes no further actions.

From the foregoing, it will be apparent that the method of the present invention provides an effective means for assigning time slots to channels requiring time slot assignments, and for managing the time slot assignments in such a way that very little time is required for transmission and acknowledgement of time slot assignments, so that a maximum of time is available for message transmission. In addition, the reallocation feature of the present invention minimizes the possibility that any channel cannot receive a time slot assignment as needed.

Although in the foregoing, the reallocation of time slots to channels which have already received initial time slot assignments progresses in a direction opposite to the sequence R, so that new assignments lie ahead of the original assignments, it is also possible for the time slot reassignments to be made in the original sequence R, provided that the search for free time slot groups starts at the beginning of a frame, at time slot number 0, and ends when it reaches the last occupied time slot location, which is occupied by the channel seeking relocation.

The relocation procedure is carried on continuously, so that as soon as one channel is relocated, the operations are repeated to relocate another channel. Optimally, when relocation of the channel occupying the last assigned time slots in the frame proves impossible, the procedure is carried out for the channel of next lower order which occupies the last group of assigned time slots of any channel of that order. In this way lower order channels may be relocated first, after which it may be possible to locate higher order channels which could not previously be relocated.

It will be apparent that modifications and additions may be made in the present invention without departing from the essential features of novelty thereof, which are intended to be defined and secured by the appended claims.

What is claimed is:

1. A method for seizing time slots in a time-division multiplex system with dynamic multiplexers which allows transmission of data channels between two stations in both directions, wherein the time slot number 0 through $(-1+2^m \cdot n)$ can be allocated in sequence to $2^m$ time slots of the time-division multiplex frame, and wherein groups of the order i of $2^i$ time slots per time-division multiplex frame can be seized with data in different channels having differing bit rates, and the time slot numbers of said groups differ by multiples of n, where m and n are positive whole numbers and i is equal to 0 or equal to a positive, whole number, comprising the steps of:

a. before the seizure of time slots, the order i of the required group of time slots is determined as a function of the existing bit rate of the data to be transmitted;

b. for identifying free time slots, the time slot groups of the order i within a first time slot group of the order m are checked in a fixed sequence (R) until a free time slot group of the order i is found;

c. when no free time slot group of the order i has been found in the search for free time slot groups within the order m, the search is carried out within further time slot groups of the order m;

d. an address is allocated to each time slot of a free group of time slots which has been found and said allocation is signalled to the multiplexer of the remote station which in turn occasions the corresponding allocation;

e. independently of the identification of a group of free time slots, seized groups of time slots are sought in reversed sequence to the fixed sequence (R);

f. as soon as a seized group of time slots is found, in the fixed sequence (R), a new group of free time slots of the same order as the seized group is sought which, relative to the fixed sequence (R), must lie in front of the seized group found;

g. when the new groups of free time slots has been found, the address allocated to the seized group is allocated to said free group of time slots and this allocation is signalled to the multiplexer of the remote station which in turn occasions the same allocation;

h. as soon as the new group of time slots is seized, the previously seized group of time slots is released.

2. The method according to claim 1, including the steps of:

a. in connection with said identifying, beginning with the first time slot group of the order m, with the time slot number 0 allocated to the number 0, a free time slot group of the order i is sought, whereby the sequence (R) of the time slots is fixed with the numbers (N0, N1, ... N7) of the time slot group of the order m and whereby a time slot group of the order i 1 consists of a time slot group of the order i−1 and of those time slots whose numbers result by means of addition of the time slot numbers of the order i−1 and the number $2^{m-1}$ times n;

b. in case no free time slot group of the order i has been found in the search for free time slots, beginning with the time slot number 0 of the first time slot group of the order m, a search, beginning with the time slots allocated to the numbers 1 through n−1, is undertaken within the further time slot groups of the order m, whereby the numbers of the time slots differ, in sequence, from the corresponding numbers of the first time slot group of the order m by the number 1 through n−1;

c. the seized groups of time slots are sought, beginning with the last time slot in reverse of the fixed sequence;

d. as soon as a seized group of time slots has been found, a new group of free time slots of the same order is sought in the fixed sequence (R), said new group, relative to the fixed sequence (R), lying closer to the time slot number 0 than the seized group found.

3. The method according to claim 2, including the step of seizing the time slots in the same, fixed sequence in the dynamic multiplexers of both of said stations, and changing the address allocations at both multiplexers in the same manner.

4. The method according to claim 1, including the step of allocating the same addresses to the same time slots for both the forward direction as well as for the reversed direction.

5. The method according to claim 1, including the steps of recognizing a file signal from a channel wishing to transmit data, seeking the required group of time slots in response to such file signal, and thereafter producing a signal representative of transmission authorization; and cancelling the allocation in response to a withdrawal signal from the same channel.

6. For use in a multi-channel time-division multiplexing system incorporating dynamic multiplexers, the combination comprising;

a speed memory for storing a representation of the speed of transmission for each channel of said system, a time slot memory for storing, relative to each time slot, a representation of the status of such time slot at any given time, file recognition means for recognizing a channel seeking time slot allocation, first time slot seeking means connected to said file recognition means, and responsive to recognition of a channel seeking time slot allocation, for referring to said speed memory for determining the number of time slots in each frame required by said seeking channel, and for referring, in a given sequence R to the cells of said time slot memory for determining if a group of the required number of time slots is free, and for storing in said time slot memory a representation of the channel assigned to the time slots of said group, channel seeking means for continuously referring to said time slot memory, in a reversed sequence relative to said sequence R, for determining the channel occupying the last occupied time slot in said sequence, second time slot seeking means, connected to and responsive to said channel seeking means for referring to said time slot memory for determining if a group of the required number of time slots is free at a location closer to the beginning of said sequence R, and for updating said time slot memory with the channel assigned to said closer group and updating the said last occupied group of time slots to released status.

7. Apparatus according to claim 6, including means for recognizing a withdrawal signal from a channel having assigned time slots, said first time slot seeking means being connected to said last named means and responsive to recognition of said withdrawal signal for updating to released status the cells of said time slot memory corresponding to the time slots assigned to said withdrawing channel.

8. Apparatus according to claim 7, including a time division multiplex signal generator for transmitting, to a remote station, the identification of a channel assigned to a given group of time slots.

9. Apparatus according to claim 8, including address recognition means located at said remote station for recognizing a channel assigned to a group of time slots and for updating a time slot memory at said remote station with the identification of the channel assigned to time slots corresponding to cells of said memory.

10. Apparatus according to claim 9, including a quiescent signal recognition device at said remote station for recognizing a channel which has been released at the originating station, and for updating the time slot memory at said remote station with the released status of the time slots assigned to said released channel.

* * * * *